Feb. 24, 1959   R. O. BOCK ET AL   2,874,903
SEMI-DIGITAL RESOLVER

Filed Oct. 19, 1953   2 Sheets-Sheet 1

INVENTORS.
ROBERT O. BOCK
GARETH M. DAVIDSON
BY
ATTORNEY.

INVENTORS.
ROBERT O. BOCK
GARETH M. DAVIDSON

United States Patent Office

2,874,903
Patented Feb. 24, 1959

2,874,903

SEMI-DIGITAL RESOLVER

Robert O. Bock, Garden City, and Gareth M. Davidson, New York, N. Y., assignors to American Bosch Arma Corporation, a corporation of New York Application October 19, 1953, Serial No. 386,998

5 Claims. (Cl. 235—186)

The present invention relates to computing device and has particular reference to high precision electromechanical resolvers for use in changing polar to rectangular coordinates.

The art of analog computers has advanced, in recent years, to the point where further increases in accuracy will result mainly from the use of components of new construction. In the induction type of electromechanical resolver, in which a pair of orthogonally disposed primary windings are rotatable relatively to a pair of orthogonally disposed secondary windings the possibilities of further refinement have almost been exhausted. An entirely new device in which the resolution of vectors is accomplished with a precision greater than that contemplated to be the ultimate in induction type resolvers is one of the components which will be needed, and the present invention is such a device.

The resolver of this invention is termed a semi-digital resolver because in operation it interpolates between the exact values of the trigonometric functions of angles which are separated by small, equal angular intervals. The interpolation is performed according to the first few terms of the series expansion for the trigonometric function in question.

Reference to any textbook on advanced mathematics will support the following equations for $\sin \theta$ and $\cos \theta$, where $\theta$ is defined as $(n\theta_1 + \Delta\theta)$ and the functions are expanded according to Taylor's formula:

$$\sin \theta = \sin (n\theta_1 + \Delta\theta)$$
$$= \sin n\theta_1 + \Delta\theta \cos n\theta_1 - \frac{\Delta\theta^2}{2} \sin n\theta_1 - \frac{\Delta\theta^3}{6} \cos n\theta_1 + \quad (1)$$

$$\cos \theta = \cos (n\theta_1 + \Delta\theta)$$
$$= \cos n\theta_1 - \Delta\theta \sin n\theta_1 - \frac{\Delta\theta^2}{2} \cos n\theta_1 + \frac{\Delta\theta^3}{6} \sin n\theta_1 + \quad (2)$$

Since $\theta = n\theta_1 + \Delta\theta$, then $n\theta_1 = \theta - \Delta\theta$ (3)

Substituting (3) into the second and following terms of Equations (1) and (2) it is found, by use of simple trigonometry and algebra, that $$\sin \theta = \sin n\theta_1 + \Delta\theta \cos \theta + \frac{\Delta\theta^2}{2} \sin \theta - \frac{\Delta\theta^3}{6} \cos \theta - \quad (4)$$

$$\cos \theta = \cos n\theta_1 - \Delta\theta \sin \theta + \frac{\Delta\theta^2}{2} \cos \theta + \frac{\Delta\theta^3}{6} \sin \theta + \quad (5)$$

If the first two terms of Equations (4) and (5) are instrumented, a device having an accuracy comparable to that of present day electromechanical resolvers is obtained. By using the first three terms the accuracy is increased beyond that now felt to be the ultimate in induction devices. The accuracy of the approximation can be demonstrated by assuming the sine output of the device to be $X$ and the cosine output to be $Y$. Then in accordance with instrumentation according to the first three terms of Equations (4) and (5)

$$X = \sin n\theta_1 + Y\Delta\theta + X\frac{\Delta\theta^2}{2} \quad (6)$$

$$Y = \cos n\theta_1 - X\Delta\theta + Y\frac{\Delta\theta^2}{2} \quad (7)$$

As will be shown, $\sin n\theta_1$ and $\cos n\theta_1$ are obtained from a tapped autotransformer, $Y\Delta\theta$ and $X\Delta\theta$ are obtained by use of linear multipliers and $$\frac{X\Delta\theta^2}{2}$$

and $$\frac{Y\Delta\theta^2}{2}$$

are obtained from squaring devices.

By means of successive substitution of (6) and (7) for $X$ and $Y$ respectively in Equations (6) and (7) it is found that $$X = \sin n\theta_1 + \Delta\theta \cos n\theta_1 - \frac{\Delta\theta^2}{2} \sin n\theta_1 - \frac{\Delta\theta^4}{4} \sin n\theta_1 + \frac{\Delta\theta^5}{4} \cos n\theta_1 \quad (6a)$$

and $$Y = \cos n\theta_1 - \Delta\theta \sin n\theta_1 + \frac{\Delta\theta^2}{2} \cos n\theta_1 + \frac{\Delta\theta^4}{4} \cos n\theta_1 - \frac{\Delta\theta^5}{4} \sin n\theta_1 \quad (7a)$$

Comparison of Equations (6a) and (7a) with Equations (4) and (5) shows agreement through the first three terms. The error due to the approximation will be no greater than the coefficient of the fourth term of $$\frac{\Delta\theta^3}{6}$$

of Equations (4) and (5). By choosing the interval $\theta_1$ small enough $$\frac{\Delta\theta^3}{6}$$

can be kept negligibly small. If an interval of three degrees, for example, is selected then the maximum error by the approximation will be approximately three-ten thousandths of one percent.

For a more complete understanding of the invention, reference may be had to the accompanying diagrams in which Figure 1 is a schematic diagram of the basic circuit of the semi-digital resolver;

Figure 1:
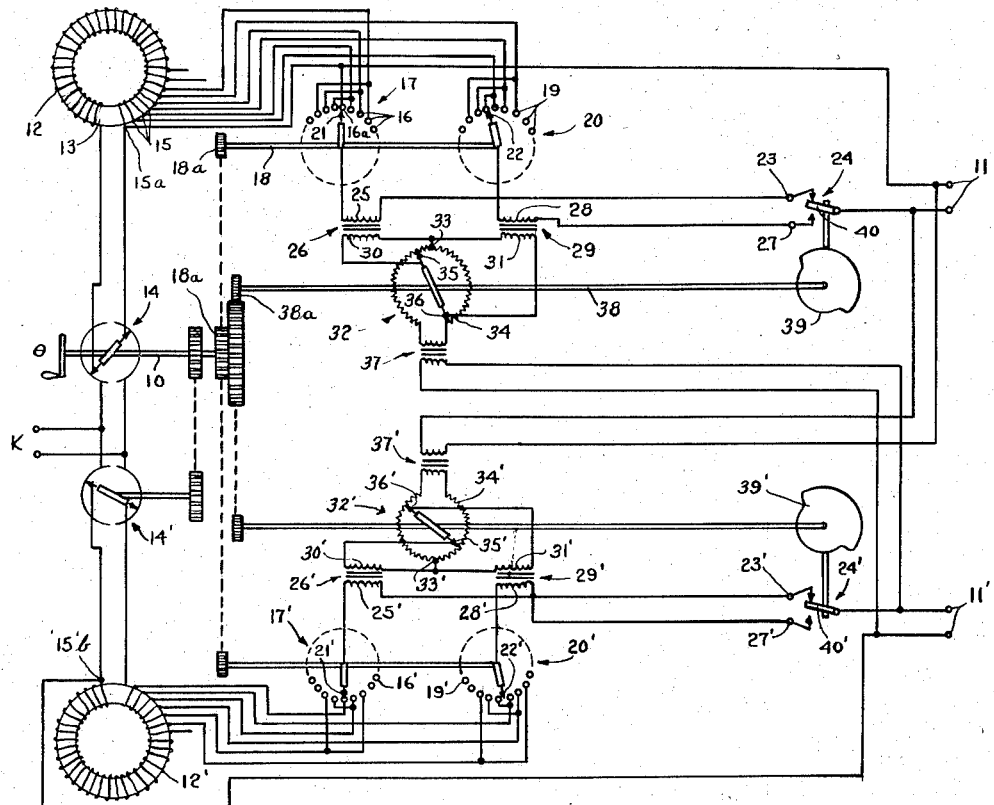

With reference now to the figures, various circuits for instrumenting the Equations (1) and (2) will be described. Figure 1 shows the basic circuit for producing output voltages which are correct through the first two terms of Equations (1) and (2). In this figure, numeral 10 designates the mechanical input shaft and numerals 11 and 11′ designate the output terminals. Transformer winding 12, wound on a toroidal core 13 for maximum accuracy, has taps 15 at intervals corresponding to the sine value of equal small steps in angle between 0 and 90°. The interval of angle may be three degrees for example, so that winding 12 is tapped at the thirty positions which correspond to sin 3°, sin 6 etc. up to sin 90°. Winding 12 is energized from a constant alternating voltage source K. The magnitude of voltage K represents the magnitude of the vector to be resolved and in this description the magnitude is considered to be unity. A reversing switch 14, actuated by shaft 10 at the 0° and 180° positions, is interposed in the connections between source K and toroid 12.

Alternate taps 15, are consecutively connected to successive stationary contacts 16 of switch 17, progressing in both directions from the initial or zero contacts 16a. The remaining taps 15 are also consecutively connected to successive stationary contacts 19 of switch 20 progressing in both directions, the first and last contact 19 being connected to the tap which corresponds to the 3° position. Movable contact 21 of switch 17 and movable contact 22 of switch 20 are driven by means of shaft 18, which in turn is driven by shaft 10 through the gearing 18a, at a speed such that the movable contacts 21 and 22 traverse all the stationary contacts 16 and 19 respectively two times for each revolution of shaft 10. Switches 17 and 20 are constructed in a manner such that movable contacts 21 and 22 are completely disconnected from the stationary contacts 16 and 19 while being driven from one contact to the next, in order to prevent shorting of any turns of the winding 12. Movable contacts 21 and 22 are also phased so that contact 21 is at the center of its travel over one of the contacts 16 while contact 22 is in the center of its travel between contacts 19, and vice versa.

Figure 2:
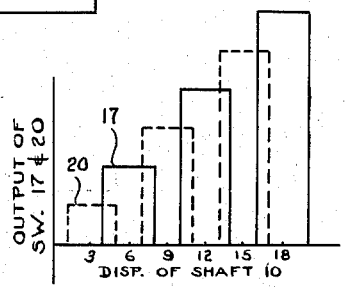
Figure 2 is a curve showing the output of the digital portion of the resolver.

The voltage outputs of switches 17 and 20, taken between the respective movable contacts 21 and 22 and the end tap 15a of winding 12, are partly shown in Figure 2, plotted against angular displacement of shaft 10. The output of switch 17, represented by the solid line of Fig. 2, is a series of discrete steps, the centers of which are at every even multiple of three degrees and which extend about two degrees to either side of the center. The amplitudes of these steps are precisely proportional to the sine of the angle at the center of the step. The output drops to zero between steps as the movable contact 21 is completely disconnected from the stationary contacts 16 during its travel from one contact to the next. The output voltage of switch 20, represented by the dotted line in Fig. 2, varies in a similar manner except that the centers of the steps occur at each odd multiple of three degrees.

Movable contact 21 is connected to one stationary contact 23 of switch 24 through the secondary winding 25 of transformer 26 and movable contact 22 is connected to the other stationary contact 27 of switch 24 through the secondary winding 28 of transformer 29. The primary windings 30 and 31 of transformers 26 and 29 respectively are energized by the several outputs of the variable autotransformer potentiometer 32 taken respectively between the center tap 33 and brush 36. The winding 34 is energized through transformer 37 by the voltage at terminals 11'.

The brushes 35 and 36 of potentiometer 32 are driven by shaft 38 which in turn is driven by shaft 10 through appropriate gearing 38a at sixty speed, i. e., shaft 38 makes sixty revolutions for each revolution of shaft 10. Shaft 38 also drives cam 39 which actuates the movable contact 40 of switch 24. The movable contact 40 is connected to one of the output terminals 11, the other of the output terminal 11 is connected to end tap 15a of toroid winding 12.

A similar arrangement of components supplies an output voltage to terminals 11'. Thus, the taps on toroidal winding 12' are connected to the stationary contacts 16' and 19' of switches 17' and 20' respectively. The outputs of switches 17' and 20' however represent the values of cosine, instead of sine, for each 3° of displacement of shaft 10, and the reversing switch 14' is actuated at 90° and at 270° of displacement of shaft 10.

The voltage at terminals 11 energizes the winding 34' of potentiometer 32' through transformer 37'. The outputs of potentiometer 32' taken between brushes 35' and 36' and center tap 33' energize the primary windings 30' and 31' of respective transformers 26' and 29'. The secondary winding 25' of transformer 26' is connected in series between movable contact 21' of switch 17' and terminal 23' of switch 24'. Also, secondary winding 28' of transformer 29' is connected in series between movable contact 22' of switch 20' and terminal 27' of switch 24'. The movable contact 40' of switch 24' is connected to one of terminals 11' the other of terminal 11' is connected to end tap 15'b of winding 12'.

Figure 3:
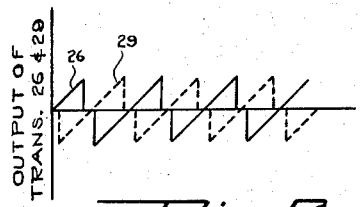
Figure 3 is a curve showing the output of the first order correction of the resolver.

Each output of potentiometer 32 varies linearly with the position of the respective brushes 35 and 36 from the center tap 33. Thus, the solid curve in Figure 3 shows the voltage between brush 35 and center tap 33 when a constant voltage energizes winding 34. The dotted curve in Fig. 3 shows the voltage between brush 36 and center tap 33. The voltage between terminal 23 and the end tap 15a on toroidal winding 12 is the sum of the outputs of switch 17 and secondary winding 25, and may be represented by the solid curve of Fig. 4. Also, the voltage between terminal 27 and end tap 15a is the sum of outputs of switch 20 and secondary winding 28 and may be represented by the dotted curve of Fig. 4.

Figure 4:
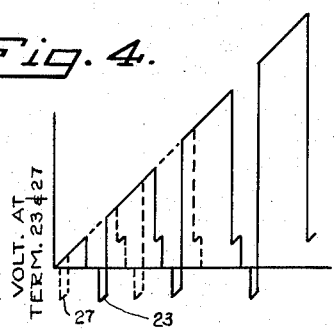
Figure 4 is a curve showing the sum of the curves of Figures 2 and 3.

It will be seen in Figure 4 that the solid and dotted curves overlap each other for about one degree at intervals of 3°. It is during these overlapping periods that cam 39 actuates the movable contact 40 of switch 24 to shift the output voltage supplied to terminals 11 from terminal 23 to terminal 27 and vice versa. Since the curves of Fig. 4 overlap, the potentials of terminals 23 and 27 are equal and switch 24 can be a make-before break type in which the terminals 23 and 27 are both momentarily connected to the movable contact 40 as the transfer of outputs is being made. The use of the make-before break type of switch will produce a continuous output at terminals 11 suitable for use in controlling servo motors. Without the make-before break type of switch, the output would be discontinuous during actuation of the switch 24 and the output at terminals 11 would be unsuitable for motor control.

In a similar manner, the voltage at terminals 11' is selected by switch 24', which is actuated by cam 39', and is a smooth continuous voltage suitable for servo-motor control.

In order to show that the outputs at terminals 11 and 11' are proportional to sin $\theta$ and cos $\theta$ respectively it will be assumed that the voltage at terminals 11 is proportional to $X'$ and that the voltage at terminals 11' is proportional to $Y'$. For these assumptions, it will be seen that $$X' = \sin n\theta_1 + kY'\Delta\theta \qquad (8)$$
$$Y' = \cos n\theta_1 + k'X'\Delta\theta \qquad (8a)$$

where $\sin n\theta_1$ is the output of the toroid 12 from switch 17 or 20.
$\cos n\theta_1$ is the output of toroid 12'.
$k$, $k'$ are the transformation ratios of transformers 37, 37'.
$\Delta\theta$ is the displacement of shafts 38 and 38'.

By successive substitution, it will be found that $$X' = \sin n\theta + k\Delta\theta \cos n\theta_1 + kk'\Delta\theta^2 \sin n\theta_1 + k^2k'\Delta\theta^3 \cos n\theta_1 + \qquad (9)$$
$$Y' = \cos n\theta + k'\Delta\theta \sin n\theta_1 + kk'\Delta\theta^2 \cos n\theta_1 + kk'^2\Delta\theta^3 \sin n\theta \qquad (10)$$

If $k$ is made equal to unity, and $k'$ is made equal to minus unity then, $$X' = \sin n\theta_1 + \Delta\theta \cos n\theta_1 - \Delta\theta^2 \sin n\theta_1 - \Delta\theta^3 \cos n\theta_1 \qquad (9a)$$
$$Y' = \cos n\theta_1 - \Delta\theta \sin n\theta_1 - \Delta\theta^2 \cos n\theta_1 + \Delta\theta^3 \sin n\theta_1 \qquad (10a)$$

Comparison of Equations (9a) and (10a) with Equations (1) and (2) shows agreement through the first two terms, and a maximum error of $$\frac{\Delta\theta^2}{2}$$

in the complete expression. Since the interval $n\theta_1$ is 3°, the maximum $\Delta\theta$ is equal to 1.5° or .025 radian. The maximum error of $(.025)^2/2=.03\%$ is too large for a precision device and further refinement is desirable.

If only the sine value is required with accuracy, the ratio $k'$ can be made equal to minus one half while keeping $k$ equal to unity, then:

$$X' = \text{sine } n\theta_1 + \Delta\theta \cos n\theta_1 - \frac{\Delta\theta^2}{2} \sin n\theta_1 - \frac{\Delta\theta^3}{2} \cos n\theta_1 \quad (11)$$

Alternatively, if only the cosine value is required with accuracy, the ratio $k$ can be made equal to one-half while keeping $k'$ equal to minus unity. Then:

$$Y' = \cos n\theta_1 - \Delta\theta \sin n\theta_1 - \frac{\Delta\theta^2}{2} \cos n\theta_1 + \frac{\Delta\theta^3}{2} \sin n\theta_1 \quad (12)$$

Figure 5:
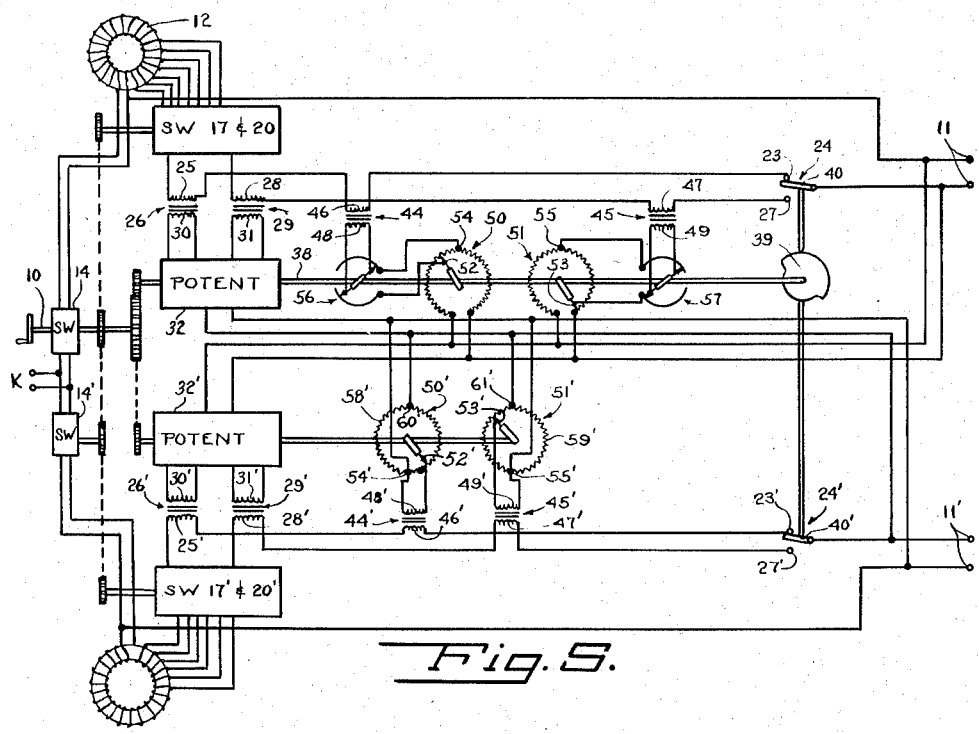
Figure 5 is a schematic diagram of one embodiment employing a second order correction.

Figure 5 shows one embodiment of a semi-digital resolver of improved accuracy. In this circuit an additional voltage is introduced to the output terminals 11 by transformers 44 and 45, the secondary windings 46 and 47 of which are connected in series between transformer 26 and 29 respectively and the switch 24. Similarly an additional voltage is introduced to the output terminal 11' by the transformer 44' and 45', the secondary windings 46' and 47' of which are connected between transformer 26' and 29' respectively and the switch 24'. The primary windings 48 and 49 of transformers 44 and 45 respectively are energized according to $$\frac{\Delta\theta^2}{2} \sin \theta$$

a voltage which may be obtained from a number of different "squaring devices." Figure 5 shows tapered potentiometers 50 and 51, energized by the voltage at terminals 11, whose brushes 52 and 53 respectively are driven by shaft 38. The outputs of the potentiometers 50 and 51, taken between the brushes and the respective center taps 54 and 55, are applied to the primary windings 48 and 49 respectively through the corresponding reversing switches 56 and 57. The reversing switches are operated by shaft 38 whenever the respective brush 52 or 53 passes by the center tap 54 or 55 or the diametrically opposite position. An alternative arrangement using non-linear induction potentiometers having windings rotatable with respect to each other may be used instead of the potentiometers 50 and 51, although resistance potentiometers are preferable since considerable error can be tolerated and the resistance potentiometers are more economical.

Potentiometers 50' and 51', which supply the voltages to the primary windings 48' and 49' are shown, for variety, as tapered potentiometers having continuous windings 58', 59' which are energized between the respective taps 54' and 60' and taps 55' and 61'. The potentiometer outputs, taken between the brushes 52' and 53' and the taps 54' and 55' may be applied directly to the transformer windings 48' and 49', since reversing is inherent in the potentiometers 50' and 51' and external reversing switches are not required.

Potentiometers 50 and 51 are energized by the voltage at terminals 11, and potentiometers 50' and 51' are energized by the voltage at terminals 11'. If these voltages are designated as X and Y, then the following equations can be written:

$$X = \sin n\theta_1 + \Delta\theta Y + \Delta\theta^2 \frac{X}{2} \quad (13)$$

$$Y = \cos n\theta_1 + \Delta\theta X + \Delta\theta^2 \frac{Y}{2} \quad (14)$$

where the sin $n\theta_1$ and cos $n\theta_1$ voltages are supplied by the toroids 12 and 12', $\Delta\theta Y$ and $\Delta\theta X$ voltage are supplied by the transformers 26, 29 and 26', 29', respectively, and $$\Delta\theta^2 \frac{Y}{2}$$

voltages are supplied by the potentiometers 50, 51 and 50', 51', respectively. Equations (13) and (14) are the same as the Equations (6) and (7) which were shown to agree closely to the expansions for sin $\theta$ and cos $\theta$. Therefore, the voltages at terminals 11 and 11' are proportional respectively to sin $\theta$ and cos $\theta$ to a high degree of accuracy, the error being no greater than $\Delta\theta^3/6$.

Figure 6:
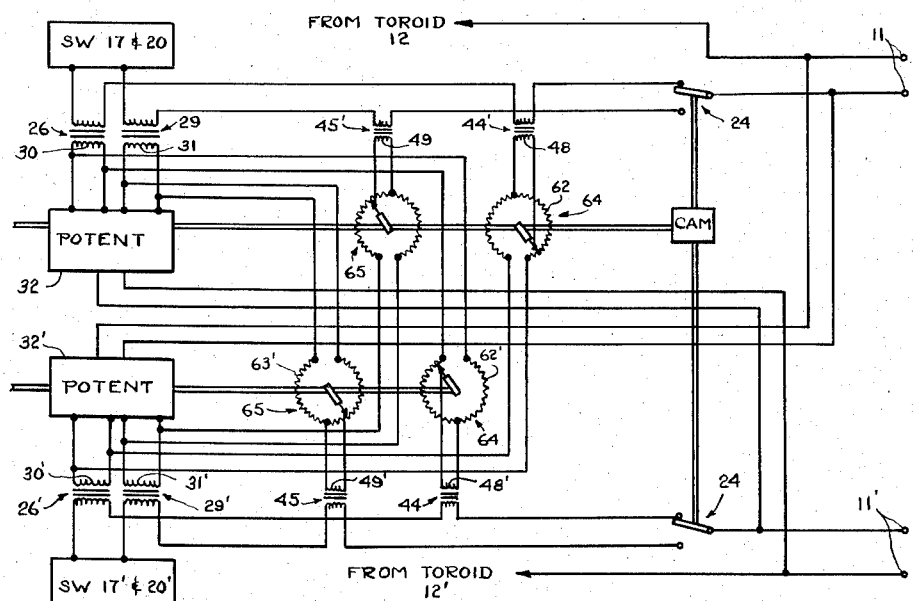
Figure 6 is a schematic diagram, in part, of another embodiment employing a different second order corrector.

Figure 6 shows a circuit in which the second order correction is obtained from a linear potentiometer, and the squaring devices of Fig. 5 are not required. In this circuit the outputs of the potentiometers 32 and 32' are used to energize linear potentiometer windings 62', 63', and 62, 63 respectively. Thus, the voltage energizing primary winding 30 is also applied to winding 62' of potentiometer 64', the voltage energizing primary winding 31 also energizes winding 63' of potentiometer 65', the voltage energizing primary winding 30' also energizes winding 62 of potentiometer 64 and the voltage energizing primary winding 31' is also applied to winding 63 of potentiometer 65. Also, the outputs of the potentiometers 64, 65, 64', and 65', taken between their respective brushes and the center taps on the windings 62, 63, 62' and 63' energize the primary windings 48, 49, and 48', 49' respectively.

The voltages at terminals 11 and 11' designated as X'' and Y'' are related in the following manner:

$$X'' = \sin n\theta_1 + \Delta\theta Y'' + \left(\frac{\Delta\theta X''}{2}\right)\Delta\theta \quad (15)$$

$$Y'' = \cos n\theta_1 + \Delta\theta X'' + \left(\frac{\Delta\theta Y''}{2}\right)\Delta\theta \quad (16)$$

Since Equations (15) and (16) are equivalent to Equations (13) and (14) it follows that X'' is proportional to sin $\theta$ and Y'' is proportional to cos $\theta$ to the same mathematical degree of accuracy.

We claim:

1. In an electromechanical resolver, an energized winding having taps, a selector switch having an output and having contacts connected to alternate of said taps, a potentiometer having an input and an output connected in series with the output of said switch and a pair of output terminals, a second energized winding having taps, a second selector switch having contacts connected to alternate taps of said second winding, a second potentiometer having a winding energized by the voltage at said output terminals and an output connected in series with the output of said second switch and a second pair of output terminals, connections between said second pair of terminals and the input to said first potentiometer, and means for simultaneously adjusting said potentiometers.

2. In an electromechanical resolver, an energized winding having taps, a selector switch having an output and having contacts connected to alternate of said taps, a potentiometer having an input and an output connected in series with the output of said switch and a pair of output terminals, a second energized winding having taps, a second selector switch having contacts connected to alternate taps of said second winding, a second potentiometer having a winding energized by the voltage at said output terminals and an output connected in series with the output of said second switch and a second pair of output terminals, connections between said second pair of terminals and the input to said first potentiometer, transformer means in the outputs of each of said potentiometers, and means for simultaneously adjusting said potentiometers.

3. In an electromechanical resolver, an energized winding having taps distributed according to a trigonometric function, a selector switch having an output and having contacts connected to alternate of said taps, a potentiometer having an input and an output connected in series with the output of said switch and a pair of output terminals, a second energized winding having taps distributed according to a trigonometric function, a second selector switch having contacts connected to alternate taps of said second winding, a second potentiometer having a winding energized by the voltage at said output terminals and an output connected in series with the output of said second switch and a second pair of output terminals, connections between said second pair of terminals and the input to said first potentiometer, and means for simultaneously adjusting said potentiometers.

4. In an electromechanical resolver, an energized winding having taps distributed according to a trigonometric function, a selector switch having an output and having contacts connected to alternate of said taps, a potentiometer having an input and an output connected in series with the output of said switch and a pair of output terminals, a second energized winding having taps distributed according to a trigonometric function, a second selector switch having contacts connected to alternate taps of said second winding, a second potentiometer having a winding energized by the voltage at said output terminals and an output connected in series with the output of said second switch and a second pair of output terminals, connections between said second pair of terminals and the input to said first potentiometer, transformer means in the outputs of each of said potentiometers, and means for simultaneously adjusting said potentiometers.

5. In an electromechanical resolver, an energized winding having taps, a switch having an output and having a movable contact and stationary contacts connected to alternate of said taps, a second switch having a movable contact and stationary contacts connected to the remaining of said taps, potentiometer means having an input and a pair of outputs, second potentiometer means having an input and a pair of outputs, series connections between the outputs of said first switch, one of said first potentiometer outputs and one of said second potentiometer outputs and a selector switch, series connections between the output of said second switch, the other of said first potentiometer outputs and the other of said second potentiometer outputs and said selector switch, a second winding having taps, a third switch having a movable contact and stationary contacts connected to alternate of said second winding taps, a fourth switch having a movable contact and stationary contacts connected to the remaining of said second winding taps, a third potentiometer means having an input and a pair of outputs, a fourth potentiometer means having an input and a pair of outputs, series connections between the output of said third switch, one of said third potentiometer outputs and one of said fourth potentiometer outputs and a second selector switch, series connections between the output of said fourth switch, the other of said third potentiometer outputs and the other of said fourth potentiometer outputs and said second selector switch, electrical conections between said first selector switch and said second and third potentiometer means inputs, electrical connections between said second selector switch and said first and fourth potentiometer means inputs, and operative connections adapted to simultaneously adjust all said switches and said potentiometer means.

References Cited in the file of this patent

UNITED STATES PATENTS

| 2,623,692 | Bedford et al. | Dec. 30, 1952 |
| 2,662,147 | Wilentchik | Dec. 8, 1953 |
| 2,781,967 | Spencer et al. | Feb. 19, 1957 |

OTHER REFERENCES

Bell—Some Aspects of Electrical Computing-Electronic Engineering, June, 1951, pages 213 to 216.